| United States Patent [19] | [11] Patent Number: 4,874,821 |
| Agostinis et al. | [45] Date of Patent: Oct. 17, 1989 |

[54] BLOCK COPOLYMER AND PROCESS FOR PREPARING IT

[75] Inventors: Enrico Agostinis, Milan; Sergio Custro, Ravenna; Alessandro Zazzetta, Cesena, all of Italy

[73] Assignee: Enichem Elastomeri S.p.A., Palermo, Italy

[21] Appl. No.: 117,631

[22] Filed: Nov. 5, 1987

[30] Foreign Application Priority Data

Jul. 31, 1987 [IT] Italy ............................... 21563 A/87

[51] Int. Cl.$^4$ ........................................... C08F 297/04
[52] U.S. Cl. ................................... 525/271; 525/250; 525/314
[58] Field of Search ..................... 525/271, 314, 250

[56] References Cited

U.S. PATENT DOCUMENTS

| | | | |
|---|---|---|---|
| 3,449,306 | 6/1969 | Zelinski | 525/250 |
| 3,907,931 | 9/1923 | Durst | 525/314 |
| 3,937,760 | 4/1974 | Cole et al. | 260/880 |
| 4,526,577 | 1/1984 | Schmidt et al. | 604/366 |

FOREIGN PATENT DOCUMENTS 1047715  3/1986  Japan ..................... 525/314

*Primary Examiner*—Wilbert J. Briggs, Sr.
*Attorney, Agent, or Firm*—Hedman, Gibson, Costigan & Hoare

[57] ABSTRACT

A linear copolymer constituted by four alternating blocks:

B1-A1-B2-A2 wherein:
B1 and B2 are polydienic blocks, and preferably polybutadiene blocks, and
A1 and A2 are polyvinylaromatic, and preferably polystyrene blocks;

which polymer has a weight average molecular weight of from 30,000 to 250,000, and a global content of monomer dienic units of from 40 to 80% by weight, wherein the weight average molecular weight of B1 block is comprised within the range of from 0.1 to 0.5 times the weight average molecular weight of B2 block, and the weight average molecular weight of A1 block is comprised within the range of from 0.25 to 2.0 times the weight average molecular weight of A2 block, and which contains between B1 and A1 blocks a copolymeric moiety formed by randomly linked monomer dienic and vinylaromatic units; is endowed with a desired balance of mechanical characteristics, rheologic characterisatics and characteristics of thermooxidative resistance.

The process to prepare such a block copolymer is disclosed.

8 Claims, 1 Drawing Sheet

BLOCK COPOLYMER AND PROCESS FOR PREPARING IT

The present invention relates to a block copolymer consisting of alternating polydienic and polyvinylaromatic blocks, endowed with a desired balance of mechanical characteristics, rheologic characteristics, and characteristics of resistance to thermooxidation. The invention relates also to the process for the preparation of such copolymer.

The anionic polymerization of suitable monomers, in the presence of metal-alkyl or metal-aryl catalysts, with the obtainment of the so-said "living polymers", is known from the prior art; such a technique is disclosed, e.g., by M. Schwarc, "Carbanions, Living Polymers and El. Transfer Processes"; Interscience Publishers, J. Wiley and Sons, New York, 1956.

In particular, by means of the living polymers technique, it is possible to prepare both linear and branched block copolymers, in particular copolymers with polybutadiene and polystyrene blocks, such as, e.g., those disclosed in U.S. Pat. Nos. 3,078,254; 3,244,644; 3,265,765; 3,280,084; 3,594,452; 3,766,301 and 3,937,760.

These block copolymers are widely used in the technique, such as, e.g., in the sector of adhesives, in compositions with bitumens, in compositions with several plastic materials, in the field of footwear, and so forth.

A major problem to be faced when dealing with the herein discussed block copolymers consists in the difficulties met in endowing said copolymers with a good balance between their rheologic characteristics, their mechanical characteristics, and their characteristics of resistance to thermooxidation.

So, for example, the three-block copolymers, known from the prior art, of A-B-A (polystyrene-polybutadiene-polystyrene) type, generally show good mechanical characteristics, but poor characteristics of resistance to thermooxidation. Furthermore, the viscosity of these copolymers, both in the molten state and in solution, is rather high, and this fact generates problems in the processing and transformation thereof.

On the other hand, the four-block linear copolymers $(AB)_2$, known from the prior art, which contain polybutadiene blocks of magnitude similar to one another, generally show good thermooxidative and rheologic characteristics, but poor mechanical characteristics. Similar considerations are valid for the multi-block linear copolymers $(AB)_n$, wherein n is an integer larger than 2, and which can reach a value of up to approximately 10.

It is the purpose of the present invention to overcome the above mentioned drawbacks of the prior art.

BRIEF DESCRIPTION OF THE DRAWINGS

The invention may be more completely understood by reference to the drawings in which.

DETAILED DESCRIPTION OF THE INVENTION

Figure 1:
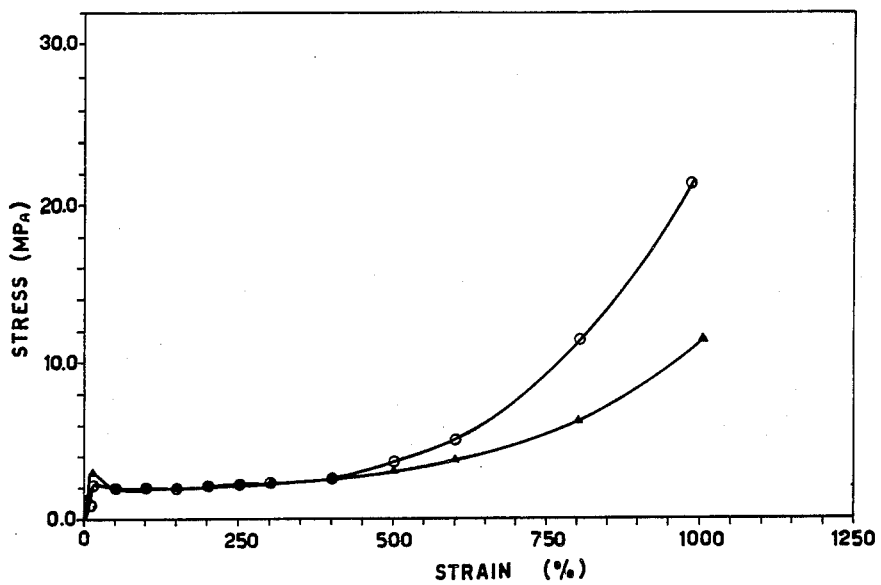
FIG. 1 is a graph comparing the intrinsic stress-resistant properties of a linear block copolymer of this invention as embodied in Example 1 (o—o) to a known copolymer from the prior art (Δ—Δ) when exposed to percent-equivalent forces of strain.

The present Applicant found, according to the instant invention, that some linear copolymers, constituted by alternating polybutadiene and polystyrene blocks, having a particular structure and distribution of the individual blocks, are able to display an unexpectedly good balance of characteristics.

In accordance with the above, according to a first aspect, the present invention relates to a linear copolymer consisting of four alternating blocks, which can be represented by the following formula:

B1-A1-B2-A2 wherein:
B1 and B2 are polydienic blocks, and
A1 and A2 are polyvinylaromatic blocks, having a weight average molecular weight of from 30,000 to 250,000, and a global content of monomer dienic units of from 40 to 80% by weight, wherein the weight average molecular weight of B1 block is comprised within the range of from 0.1 to 0.5 times the weight average molecular weight of B2 block, and the weight average molecular weight of A1 block is comprised within the range of from 0.25 to 2.0 times the weight average molecular weight of A2 block, and which contains between B1 and A1 blocks a copolymeric moiety formed by randomly linked monomer dienic and vinylaromatic units;
said block copolymer being endowed with a desired balance of mechanical characteristics, rheologic characteristics and characteristics of thermooxidative resistance.

In the preferred form of practical embodiment:
B1 and B2 blocks are polybutadiene blocks and A1 and A2 blocks are polystyrene blocks;
the weight average molecular weight of B1-A1-B2-A2 copolymer varies within the range of from 50,000 to 150,000;
the total content of dienic units in the same copolymer varies within the range of from 50% to 70% by weight;
the weight average molecular weight of B1 block varies within the range of from 0.1 to 0.3 times the weight average molecular weight of B2 block; and
the weight average molecular weight of A1 block varies within the range of from 0.5 to 1.5 times the weight average molecular weight of A2 block.

In the above definitions, relating to the ratios between the molecular weights of the various blocks, B1 and A1 are assumed to be pure blocks. In other terms, the dienic units and the vinylaromatic units present in the copolymeric moiety are respectively attributed to B1 and A1 moieties.

B1 and B2 blocks, of the copolymers of the present invention, are hereinunder described as polybutadienic blocks. However, the same advantages, or similar advantages, are achieved, when butadiene is replaced by other dienic monomers.

In a similar way, A1 and A2 blocks, of the copolymers of the present invention, are hereinunder described as polystyrenic blocks. However, the same advantages, or similar advantages, are achieved, when the polystyrenic blocks are replaced by blocks consisting of another vinylaromatic monomer, such as, e.g., alpha-methyl-styrene and vinyl-toluene.

The linear copolymer consisting of four alternating blocks of the present invention is obtained by polymerization, by operating in an organic, aliphatic or cycloaliphatic solvent, at temperatures comprised within the range of from 30° to 150° C., and under pressures equal to, or higher than, the atmospheric value, in the presence of metal-alkyl or metal-aryl catalysts, normally used in the synthesis of the living polymers.

The preferred catalysts for the intended purpose are lithium-alkyl, wherein the alkyl, which may be linear, or branched, can contain from 3 to 7 carbon atoms, and, preferably, 4 carbon atoms; it is, in particular, lithium-sec.-butyl.

These catalysts are normally used in amounts ranging from 0.025 to 0.20 parts by weight, per each 100 parts by weight of the monomers submitted to polymerization.

The suitable solvents for the intended purpose are usually selected from n-hexane and cyclohexane.

In particular, in the preparation of the linear copolymer constituted by four alternating blocks B1-A1-B2-A2, the process is advantageously carried out as follows:

in a first step of polymerization, metered amounts of butadiene and sytrene, mixed together, are fed, and are polymerized in solution, with a suitable catalytic system for the synthesis of the living polymers, up to a complete, or substantially complete, conversion of the monomers; in this way, a living copolymer is formed, which is constituted by two not-pure B1-A1 blocks, i.e., which are linked with each other by a copolymeric chain constituted by randomly linked monomeric units of butadiene and sytrene;

in a second step, to the product obtained in the first step, a metered amount of butadiene is fed, and said butadiene is polymerized up to a complete, or substantially complete conversion; in this way, a three-block B1-A1-B2 living copolymer is obtained, which is free, or at least substantially free from a copolymeric moiety between A1 and B2 blocks;

in a third step, to the product obtained in the second step, a metered amount of styrene is fed, and said styrene is polymerized up to a complete, or substantially complete conversion, so that the four-block A1-B1-A2-B2 living copolymer is obtained, which is free, or at least substantially free from a copolymeric moiety between A2 and B2 blocks.

This process is carried out under the above-indicated general polymerization conditions, and, in the preferred form of practical embodiment of the invention, the process is carried out in n-hexane or cyclohexane as the solvent, with lithium-sec.-butyl as the catalyst, under adiabatic conditions, with progressively increasing temperatures from an initial value of approximately 50° C., up to an end value of approximately 100° C.

When the process is carried out under the above shown conditions, the copolymeric moiety constituted by randomly linked monomeric units of butadiene and styrene represents from 5 to 15% of the weight of the total copolymer.

In any case, at the end of the process, the reaction is quenched by means of the addition of a suitable stopper, which neutralizes the catalytic activity of lithium, e.g., methanol, and the linear, four-alternating-block copolymer is recovered by the usual means, e.g., by evaporating off the solvent in a steam stream, and drying the solid obtained as the residue from said evaporation.

By operating according to the present invention, linear copolymers are obtained, which are constituted by four alternating polydienic and polyvinylaromatic blocks, which show a balance of unexpectedly good characteristics as relates to their mechanical properties, thermooxidative resistance properties and rheologic properties (low values of viscosity of the material in the molten state, or in solution).

The following experimental values are illustrative and not limitative of the scope of the present invention.

EXAMPLE 1

To a thermally-insulated steel reactor, of 1,000 ml of capacity, equipped with mechanical stirrer, 11 g of 1,3-butadiene (purity higher than 99.5%); 21 g of styrene (purity higher than 99.5%); 600 g of anhydrous n-hexane and 0.09 g of lithium sec.-butyl are charged in the order given.

The mass is heated to 50° C., and, after 40 minutes, it adiabatically reaches the temperature of 75° C. Under these conditions, the conversion of the monomers is practically complete.

To the so-obtained polymeric solution, 47 g of 1,3-butadiene is fed, and is polymerized for 20 minutes, during which time the temperature spontaneously increases up to approximately 95° C.

At the end of this time period, the conversion of butadiene is practically complete.

To the so-obtained polymeric solution, 21 g of styrene is fed, and is polymerized for 15 minutes, during which time the temperature spontaneously increases up to approximately 100° C.

At the end of this time period, the conversion of styrene is practically complete.

At the end of the polymerization, methanol (2 ml) is added, and to the reaction mass, cooled to 60° C., 0.5 g of BHT (2,6-di-tert.-butyl-p-cresol) and 1.0 g of triphenyl-nonyl-phosphite are added.

The polymer is recovered from the solution by evaporating the solvent in a steam stream, and drying the solid residue inside a vacuum oven, at 60° C. for 12 hours.

In this way, 99.9 g is recovered of a linear copolymer constituted by four alternating blocks

B1-A1-B2-A2;

which polymer has a weight average molecular weight $Mw=70,000$, and the following average molecular weights of the individual blocks: $B1=8,000$; $A1=15,000$; $B2=32,000$; and $A2=15,000$.

B1 and A1 molecular weight is referred to the blocks considered as pure, i.e., pure of alternating units, and is evaluated at the end of the first polymerization step. B2 and A2 blocks are determined by gel-permeation chromatography, carried out at the end of the second and of the third step of polymerization.

In this way, the weight average molecular weight of B1 block is equal to 0.25 times that of B2 block, and the weight average molecular weight of A1 block is approximately equal to that of A2 block.

Furthermore, B1 and A1 blocks result to be linked to each other by a random copolymeric moiety (containing randomly linked monomeric units of butadiene and styrene) representing approximately 10% of the weight of the total copolymer, whilst between A1 and B2 units, and between B2 and A2 units, no copolymeric moieties appear. These determinations have been carried out by determining the styrene weight after oxidation with OsO$_4$ (ASTM D 3314).

EXAMPLE 2

The mechanical properties of the linear, four-alternating-block copolymer of Example 1 are compared to those of the polybutadiene-polystrene copolymer known from the prior art, of (AB)$_2$ type, containing copolymeric moieties in each individual block, with 43% by weight of styrene, and having a weight average molecular weight Mw equal to approximately 75,000, with a Melt Flow Index of 9 g/minute (190° C., 5 kg/cm$^2$).

In FIG. 1 of the hereto attached drawing table, the stress-strain curves are reported, which are obtained by testing specimens from the two products, compression-moulded at 180° C., with press-cooling. In particular, the o—o curve relates to the copolymer of Example 1, and the ∆—∆ curve relates to the copolymer known from the prior art.

The shape of the two curves demonstrates the better characteristics of the copolymer of Example 1, as compared to that known from the prior art.

EXAMPLE 3

The linear, four-alternating-block copolymer of Example 1, and the multiblock polybutadiene-polystyrene copolymer described in Example 2 are transformed into a composition for hot-melts, as shown by the hereunder Table 1:

TABLE 1

| Component | Parts by Weight |
| --- | --- |
| Polymer | 100 |
| Liquid resin ECR 140 A[1] | 20 |
| Zonatac 501 Lite[2] adhesion promoter | 140 |
| Shellflex 371[3] oil | 25 |
| Irganox 1076[4] antioxidant | 1.0 |
| Polygard[5] antioxidant | 0.5 |

(1) Aliphatic hydrocarbon resin, a commercial product by EXXON Company.
(2) Promoter of modified terpenic type, a commercial product by ARIZONA Company.
(3) Oil of naphthenic type, a commercial product by SHELL Company.
(4) Antioxidant of phenolic type, a commercial product by CIBA-GEIGY Company.
(5) Antioxidant of phosphite type, a commercial product by NAUGATUCK Company.

In the following Table 2, the main adhesive properties are reported of the formulation obtained from the linear, four-alternating-block copolymer of Example 1 (Formulation 1) and of the formulation obtained from the block copolymer (Formulation 2) of Example 2.

TABLE 2

| Property | Formulation 1 | Formulation 2 |
| --- | --- | --- |
| Polyken tack (g; ASTM 2979) | 210 | 200 |
| Loop tack (g/2.5 cm; PSTC 5) | 200 | 200 |
| Peeling (g/2.5 cm; PSTC 1) | 2,000 | 2,200 |
| Holding Power (g/2.5 cm; PSTC 7 | 40 | 40 |

NOTE: PSTC=Pressure Sensitive Testing Council.

From the data shown in the above Table, the properties of the two formulations appear to be substantially equivalent.

In the following Table 3, the comparison is furthermore shown between the thermo-oxidative stability at 180° C. of Formulation 1 and that of Formulation 2. The data shown in Table 3 are Brookfield viscosity values expressed as cps, measured at 180° C.

TABLE 3

| Time (days) | Formulation 1 (viscosity) | Formulation 2 (viscosity) |
| --- | --- | --- |
| 0 | 15,000 | 12,500 |
| 2 | 18,400 | 18,500 |
| 4 | 26,500 | 25,000 |

As it results evident from the data shown in above Table 3, the increase in viscosity of Formulations 1 and 2 over time results practically equivalent.

On considering the whole set of the results, one can conclude that the copolymer of Example 1 shows better mechanical characteristics, while maintaining the good properties of adhesion and thermooxidative resistance as of the copolymer of Example 2.

EXAMPLE 4

The mechanical characteristics of the linear, four-alternating-block copolymer of Example 1 are compared to those of the commercial radial copolymer SOLT 162 of ENICHEM ELASTOMERI Company.

This is a copolymer of SBS type (S=polystyrene; B=polybutadiene), containing 40% by weight of styrene, and having a weight average molecular weight Mw of approximately 150,000.

The results are shown in following Table 4.

TABLE 4

| Property | Copolymer of Example 1 | Commercial Copolymer |
| --- | --- | --- |
| Tensile strength (kg/cm$^2$) (ASTM D 412) | 220 | 200 |
| Elongation at break (%) (ASTM D 412) | 650 | 950 |

The above results show that the copolymer of Example 1 shows a better thermooxidative resistance than the copolymer of Example 4, anyway retaining the good mechanical characteristics of this latter.

EXAMPLE 5

The commercial copolymer of Example 4 is transformed into a composition (Formulation 3) for hot-melts, with the components shown in Table 1.

Said Formulation 3 is compared to Formulation 1 of Example 3, as to the characteristics of thermooxidative stability.

The obtained data is shown in following Table 5.

TABLE 5

| Time (days) | Formulation 1 (viscosity) | Formulation 3 (viscosity) |
| --- | --- | --- |
| 0 | 15,000 | 81,000 |
| 2 | 18,400 | 176,500 |
| 4 | 26,500 | 300,000 |

The values of viscosity reported in Table 5 are Brookfield viscosity values, expressed as cps, at 180° C.

EXAMPLE 6 (Comparative Example)

The polymerization process is carried out as disclosed in Example 1, with the only difference that to the initial charge, 29 g of 1,3-butadiene is fed (instead of the 11 g fed in Example 1), so to obtain a four-block B1-A1-B2-A2 copolymer, wherein B1 and B2 blocks have the same molecular weight.

Also in this evaluation, B1 and B2 blocks are assumed to be pure.

Figure 2:
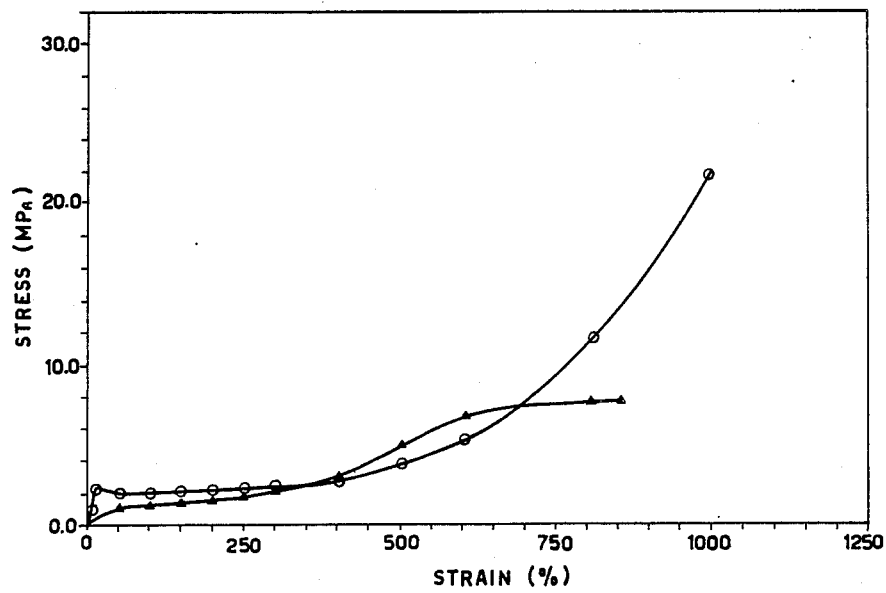
FIG. 2 is a graph comparing the intrinsic stress-resistant properties of linear block copolymers of this invention as embodied in Example 1 (o—o) to that of Comparative Example 6 (Δ—Δ) when exposed to percent-equivalent forces of strain.

In FIG. 2 of the hereto attached drawing table, the stress/strain curve is reported of the four-block copolymer obtained in the present Example (Δ—Δ curve), as compared to the four-block copolymer of Example 1 (o—o curve).

Also in this case, the copolymer of Example 1 shows better mechanical properties than the copolymer used for comparison purposes.

We claim:

1. Linear copolymer consisting of four alternating blocks, endowed with a good balance between mechanical properties, rheologic properties and properties of resistance to thermooxidation, having the following general formula:

B1-A1-B2-A2 wherein:
  B1 and B2 are polydienic blocks, and
  A1 and A2 are polyvinylaromatic blocks, having a weight average molecular weight of from 30,000 to 250,000, and a global content of monomer butadiene units of from 40 to 80% by weight, wherein the weight average molecular weight of B1 block is from 0.1 to 0.5 times the weight average molecular weight of B2 block, and the weight average molecular weight of A1 block is from 0.25 to 2.0 times the weight average molecular weight of A2 block, and which furthermore contains between B1 and A1 blocks a copolymer moiety formed by randomly linked monomer dienic and vinylaromatic units, characterized in that said copolymer moiety represents from 5 to 15% of the weight of the total copolymer.

2. Process for the preparation of a linear copolymer, constituted by four alternating blocks having the following general formula:

B1-A1-B2-A2 wherein
  B1 and B2 are polydienic blocks, and
  A1 and A2 are polyvinylaromatic blocks, having a weight average molecular weight of from 30,000 to 250,000, and a global content of monomer butadiene units of from 40 to 80% by weight, wherein the weight average molecular weight of B1 block is from 0.1 to 0.5 times the weight average molecular weight of B2 block, and the weight average molecular weight of A1 block is from 0.25 to 2.0 times the weight average molecular weight of A2 block, and which furthermore contains between B1 and A1 blocks a copolymer moiety formed by randomly linked monomer dienic and vinylaromatic units, characterized in that:
  in a first step of polymerization, by the living polymer technique, metered amounts of a diene and of a vinylaromatic monomer, mixed together, are polymerized up to at least a substantially complete conversion of the monomers;
  a metered amount of a diene is added to the product from the first step, and is polymerized, in a second step, by the living polymer technique, up to at least a substantially complete conversion of the diene fed;
  a metered amount of vinylaromatic monomer is added to the product from the second step, and is polymerized in a third step, up to at least a substantially complete conversion of the vinylaromatic monomer fed; and
  the copolymer is recovered from the polymerization products of the third step.

3. Process according to claim 2, characterized in that the polymerization is carried out by operating in an organic, aliphatic or cycloaliphatic solvent, at temperatures from 30° to 150° C., and under a pressure equal to, or higher than the atmospheric pressure, in the presence of metal-alkyl or metal-aryl catalysts.

4. Process according to claim 3, characterized in that the solvent is n-hexane or cyclohexane, and the reaction temperature is from 50° to 100° C., the catalyst is lithium-alkyl, containing from 3 to 7 carbon atoms in the alkyl radical, and said catalyst is used in amounts from 0.025 to 0.20 parts by weight per each 100 parts by weight of the diene plus vinylaromatic compound monomers.

5. Process according to claim 2, characterized in that the diene is butadiene, and the vinylaromatic compound is styrene.

6. Process according to claim 2, characterized in that the copolymer has a weight average molecular weight from 50,000 to 150,000; a total content of butadiene units from 50% to 70% by weight; and wherein the weight average molecular weight of B1 block varies within the range of from 0.1 to 0.3 times the weight average molecular weight of B2 block, and the weight average molecular weight of A1 block varies within the range of from 0.5 to 1.5 times the weight average molecular weight of A2 block.

7. Process according to claim 2, characterized in that the copolymeric moiety represents from 5 to 15% of the weight of the total copolymer.

8. Process according to claim 2, characterized in that the dienic blocks are polybutadiene blocks, and the polyvinyl aromatic blocks are polystyrene blocks.

* * * * *